though employable in the invention, somewhat better results are obtained with a cleaner sand, e.g., lake sand. Either may be employed.

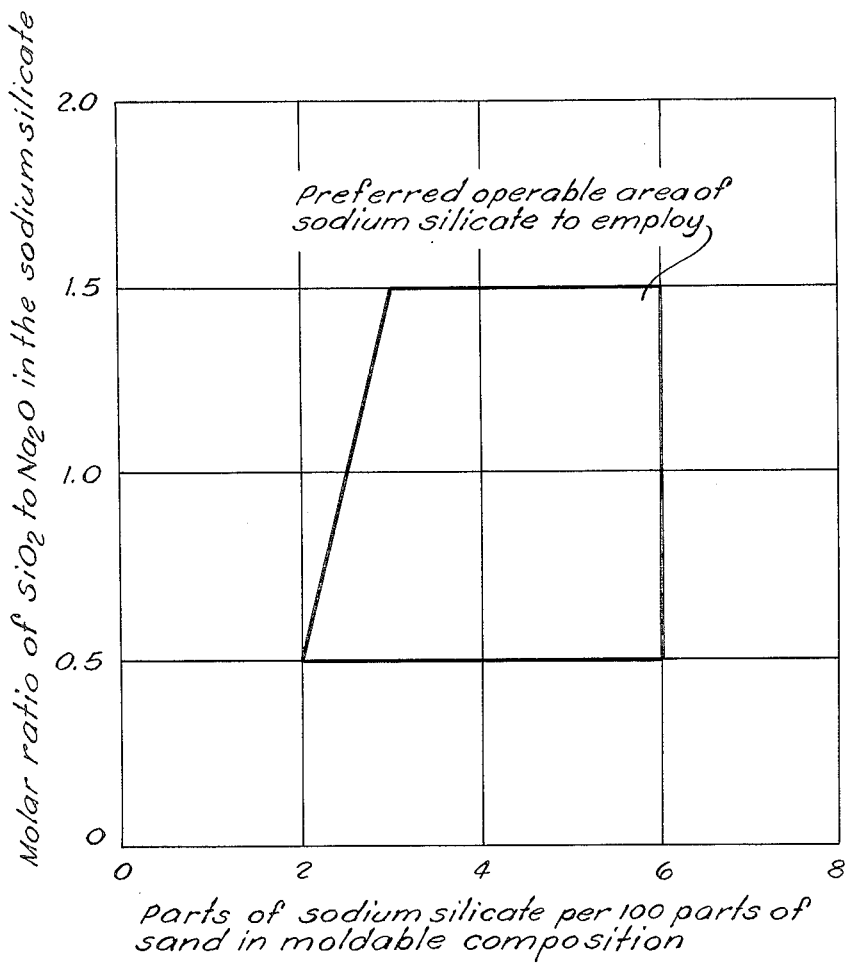

3,230,099
CARBON DIOXIDE CURED SAND MOLDS EMPLOYING DRY SODIUM SILICATE BINDER
Ronald H. Cooper, Clare, Mich., assignor to The Dow Chemical Company, Midland, Mich., a corporation of Delaware
Filed Sept. 1, 1960, Ser. No. 53,543
12 Claims. (Cl. 106—38.35)

The invention concerns an improved composition and method of use thereof for making sand molds and cores.

Cores and molds composed largely of sand intermixed with a binder are widely used and of extensive importance in the art of casting metals. A number of substances have been employed as binders for such use, among which is liquid sodium silicate. Different techniques for curing or hardening molds which are cast from compositions comprising sand and liquid sodium silicate have been tried among which is the use of carbon dioxide gas. Efforts to produce satisfactory sand molds for foundry use employing liquid sodium silicate as the binder, have not been fully satisfactory for a number of reasons among which are the sticky and messy nature of the composition during molding and the unsatisfactory immediate green strength (strength before cure) of molds made employing the known composition when cured by known methods including those employing carbon dioxide gas.

A need exists for a binder which does not have the sticky and otherwise undesirable characteristics of liquid sodium silicate which is employable with foundry sand, either in the presence or absence of such other known sand mold ingredients as pitch, invert sugar, sea coal, and dextrose compositions, and which is settable by subjection to the action of ambient carbon dioxide gas, to produce a mold or core having improved physical properties for subsequent use in the casting of metals.

The invention meets this need by providing the improved composition and method employing such composition hereinafter described and defined.

The invention, accordingly, is a moldable deformable composition of matter comprising foundry grade sand, dry sodium silicate consisting of between about 0.5 and 1.5 moles of $SiO_2$ per mole of $Na_2O$, and sufficient water to make a free flowing moldable mass of desired consistency and the method of making molds and cores comprising admixing the sodium silicate as a dry powder with the sand, admixing water therewith to make a moldable composition, forming the composition into desirable shapes, and curing or setting the shapes or castings by subjecting them to the action of a $CO_2$ atmosphere for a short time, e.g., 5 seconds to a minute. No baking or heating during the $CO_2$ treatment is required. The molds or cores made according to the invention are readily collapsible after use in molding operations. The cores or molds made according to the invention, characteristic of freshly made sand molds generally, may have the compressive strength improved by aging, i.e., standing or remaining in storage for a time before use. Molds made according to the invention show improvement up to at least about 24 hours after the $CO_2$ treatment. Although one of the advantages of the invention is the lack of any need for ovens or heating equipment, such equipment when at hand may be employed to effect the benefits of aging within a shorter time. For example, 15 minutes at about 325° F., following $CO_2$ treatment, effects about the same improvement in compressive strength as 24 hours aging at room temperature. In practice, however, it usually entails less inconvenience to set aside the molds or cores for a few hours at room temperature than to be encumbered by heating ovens (otherwise not needed) and undergo the added cost and bother of accelerating aging by heating.

A carbonaceous substance, e.g., pitch, sea coal, or dextrin, when admixed with the dry sodium silicate and sand mixture and subsequently water-wetted has been found to improve the properties thereof and such practice constitutes an embodiment of the invention.

When the molar ratio of $SiO_2$ to $Na_2O$ in the dry sodium silicate approaches or is 0.5, at least 2 parts thereof, per 100 parts by weight of the sand, should be employed. When sodium silicate, having an increased molar ratio of $SiO_2$ to the $Na_2O$ is employed, the minimum amount of such sodium silicate to employ increases somewhat so that when the molar ratio of $SiO_2$ to $Na_2O$ approaches or is 1.5, at least 3 parts per 100 parts by weight of sand should be employed. Not over 6 parts of sodium silicate, per 100 parts by weight of the sand is usually employed in the invention. The annexed figure shows graphically the parts by weight sodium silicate having varying ratios of $SiO_2$ to $Na_2O$, per 100 parts of sand, employed in the invention.

The amount of water employed is substantially the same as the weight of the sodium silicate employed although somewhat more or less water may be employed. For example, best results are obtained by employing an amount of water which is somewhat greater than the amount of sodium silicate when the sodium silicate employed contains the higher acceptable molar ratio of $SiO_2$ to $Na_2O$, viz. that of 1.5.

When sodium disilicate, sometimes expressed by the formula, $Na_2Si_2O_5$, having a molar proportion of 2 $SiO_2$: 1 $Na_2O$, is employed in a sand mixture containing the desired moisture content, the composition so made does not set satisfactorily upon subsequent treatment with $CO_2$ gas. The preferred sodium silicate to use is that commonly referred to as orthosilicate, sometimes expressed by the formula, $Na_4SiO_4$, which is a molar ratio of $SiO_2$ to $Na_2O$ of 0.5. It is preferably employed in an amount of between 2 and 4 parts per 100 parts by weight of sand.

The sand employed is foundry grade sand having an A.F.S. number of between 50 and 150. A grade between No. 60 and 80 is preferred. Details on A.F.S. foundry grade sand and the significance of the numbers are procurable from the American Foundrymen's Society, Chicago, Illinois, U.S.A. They are discussed in "Foundry Core Practice," by Harry W. Dietert, published by the American Foundrymen's Society (1952).

Curing of the molded or formed sodium silicate-sand-water composition thus made is effected in any convenient chamber provided with suitable means for introducing $CO_2$ gas. The length of time required for a satisfactory cure depends upon a number of factors, chief among which is the thickness of the molds and the rate of introduction of $CO_2$ gas. A $CO_2$ line gauge pressure of about 14 pounds per square inch is commonly employed, but less or greater pressures are suitable. The length of time required for cure varies from about 5 to 90 seconds, 5 to 20 seconds usually being employed when using a sodium silicate having a molar ratio of $SiO_2$ to $Na_2O$ of 1.5 and 40 to 60 seconds usually being employed for a sodium silicate mole ratio of $SiO_2$ to $Na_2O$ of 0.5. Descriptions of ovens suitable for use in curing with carbon dioxide gas and details of their operations are described in "A Practical Guide to the $CO_2$ Process," published jointly by the Textile Chemical Co. and the International Foundry Supply Co. and "Handbook of the Carbon Dioxide Mold and Core Hardening Procedure," procurable from the Carver Foundry Products Co., Muscatine, Iowa.

Bank sand was employed because it offers more difficulties than other foundry grade sand, due to the presence of between 0.5 and 1.0 percent clay. However, it is more readily procured and less expensive. Its successful use is a more severe test of the suitability of the composition of the invention and also indicates the extent of its economic significance.

The molds or cores produced in accordance with the invention have good compressive strength values. For purposes of illustrating the invention, the cores were formed in a Harry D. Dietert Company (Detroit, Michigan) master precision specimen tube, 2″ x 4¾″ in size, employing core box No. 315–18, and rammed to a 2″ length by three successive impacts of a Harry W. Dietert sand rammer No. 315–17. The cores thus formed, after cure in ambient $CO_2$ gas, were tested in the Harry W. Dietert Universal Sand Strength Machine to obtain compressive strength values in p.s.i. Compressive strength values of less than about 200 p.s.i. or more than about 1200 p.s.i., as obtained by the Dietert machine, are considered unsatisfactory for the manufacture of cores.

The following test runs were made, some of which are illustrative of the practice of the invention, designated examples, and some not illustrative of the invention, designated comparative runs. The examples are distinguished by numbers and the comparative runs by letters.

In each of the runs, 1000 grams of A.F.S. No. 67 Gratiot bank foundry grade sand and dry sodium silicate, having the molar ratio of $SiO_2$ to $Na_2O$ and in the amount stated in the table below, were put in a muller and intermixed for 1 minute. Then the amount of water stated in the table was added thereto and mixed for 3 minutes. A free-flowing moldable composition was thereby produced which was cast into the 2-inch long cylindrical test cores described above and cured in a chamber into which $CO_2$ gas was admitted at a pressure of 14 pounds/square inch gauge pressure for between 10 and 60 seconds. The cores so made were removed therefrom and allowed to age 24 hours at room temperature and thereafter the compression strength values thereof determined by use of the Dietert testing machine described above. The more important details and test results are entered in Table I which is set out hereinafter.

In Comparative Runs A and B, 40 grams (4 percent by weight) of sodium silicate having a molar ratio of $SiO_2$ to $Na_2O$ of 2 was used. 40 grams of water were added in Run 1 and 60 grams in Run 2.

In Examples 1 to 6, the sodium silicate employed was that having an acceptable molar ratio of $SiO_2$ to $Na_2O$ of 1.5 and was varied in the amount of either 30 or 40 grams (3 percent or 4 percent by weight). The water was varied between 30 and 50 grams, (3 to 5 percent by weight). In Examples 3 and 6, 10 grams of pitch were admixed therewith.

In Comparative Run C, only 20 grams (2 percent by weight) of sodium silicate having an acceptable molar ratio of $SiO_2$ to $Na_2O$ of 1.5 were used.

In Examples 7 to 15, the sodium silicate employed was that having an acceptable molar ratio of $SiO_2$ to $Na_2O$ of 0.5, representing the minimum limit of the range of $SiO_2$ to $Na_2O$ satisfactory for the practice of the invention. The amounts of both the sodium silicate and water were varied from 20 to 40 grams (2 percent to 4 percent by weight). 10 grams (10 percent by weight) of pitch were added in Examples 8, 11, 12, and 15.

| Run designation | Additament to core composition, mole ratio of powdered sodium silicate | Amount added in grams | | | Compressive strength in p.s.i. after air-drying 24 hours following $CO_2$ treatment |
|---|---|---|---|---|---|
| | | Silicate | H₂O | Pitch | |
| A | 2 $SiO_2$:1 $Na_2O$ | 40 | 40 | | (¹) |
| B | 2 $SiO_2$:1 $Na_2O$ | 40 | 60 | | (¹) |
| 1 | 1.5 $SiO_2$:1 $Na_2O$ | 40 | 40 | | 768 |
| 2 | 1.5 $SiO_2$:1 $Na_2O$ | 40 | 50 | | 982 |
| 3 | 1.5 $SiO_2$:1 $Na_2O$ | 40 | 50 | 10 | 1,035 |
| 4 | 1.5 $SiO_2$:1 $Na_2O$ | 30 | 30 | | 380 |
| 5 | 1.5 $SiO_2$:1 $Na_2O$ | 30 | 40 | | 670 |
| 6 | 1.5 $SiO_2$:1 $Na_2O$ | 30 | 40 | 10 | 480 |
| C | 1.5 $SiO_2$:1 $Na_2O$ | 20 | 20 | | 67 |
| 7 | 0.5 $SiO_2$:1 $Na_2O$ | 40 | 40 | | 1,030 |
| 8 | 0.5 $SiO_2$:1 $Na_2O$ | 40 | 40 | 10 | 926 |
| 9 | 0.5 $SiO_2$:1 $Na_2O$ | 30 | 30 | | 568 |
| 10 | 0.5 $SiO_2$:1 $Na_2O$ | 30 | 40 | | 354 |
| 11 | 0.5 $SiO_2$:1 $Na_2O$ | 30 | 30 | 10 | 600 |
| 12 | 0.5 $SiO_2$:1 $Na_2O$ | 30 | 40 | 10 | 408 |
| 13 | 0.5 $SiO_2$:1 $Na_2O$ | 20 | 20 | | 294 |
| 14 | 0.5 $SiO_2$:1 $Na_2O$ | 20 | 30 | | 206 |
| 15 | 0.5 $SiO_2$:1 $Na_2O$ | 20 | 20 | 10 | 249 |

¹ Will not gell with $CO_2$.
1000 grams of No. 67 A.F.S. sand used in all runs.
Mulling time: 1 minute before adding water and 3 minutes after water added, in all runs.
Curing conditions: 10–60 seconds in ambient $CO_2$ gas.

Referring to Comparative Runs A and B of the table, it can readily be seen that where the molar ratio of the $SiO_2$ to $Na_2O$ in the sodium silicate is 2, attempts to produce satisfactory cores fail.

Examples 1 to 6 show that satisfactory cores are produced when the $SiO_2$ to $Na_2O$ in the sodium silicate employed has a molar ratio of 1.5, when employed in an amount varying between 3 and 4 percent, by weight of the sand and in the presence of between 3 and 5 percent water, with or without pitch being added.

Comparative Run C, which employs 2 percent of sodium silicate having a molar ratio of $SiO_2$ to $Na_2O$ of 1.5 (which is satisfactory in higher amounts) was shown to produce an unsatisfactory core when such molar ratio is employed in that amount.

Examples 7 to 15 show that sodium silicate having a molar ratio of $SiO_2$ to $Na_2O$ of 0.5 can be employed in an amount of between 2 and 4 percent by weight of the sand, in the presence of between 2 and 4 percent water, and with or without pitch, to produce satisfactory cores. It also, therefore, shows that when the ratio of $SiO_2$ to $Na_2O$ approaches the minimum of the permissible ratio specified in the practice of the invention, cores can be made employing only 2 percent sodium silicate.

Reference to the annexed figure graphically shows the parts of sodium silicate, having the desired $SiO_2$:$Na_2O$ ratio to employ in parts by weight per 100 parts of sand.

Tests were conducted to ascertain the collapsibility of the cores produced in accordance with the invention and contrasted with cores produced by known practice. The cores employing the dry powdered silicate in accordance with the invention showed equally satisfactory collapsibility to those made in accordance with known practice.

An examination of the examples and comparative runs set out in the table shows that the composition of the invention prepared and cured in accordance with the method of the invention produces a core which is comparable or superior to cores produced employing known compositions without the accompanying disadvantages of using a sticky objectionable mixture which exists when liquid sodium silicates or solutions thereof are employed.

Having described the invention, what I claim and desire to protect by Letters Patent is:

1. A composition of matter useful for making sand cores and molds curable by subjecting to an ambient atmosphere comprising carbon dioxide gas consisting of a mixture of foundry grade sand and a powdered dry sodium silicate, composed of between 0.5 and 1.5 moles of $SiO_2$ per mole of $Na_2O$, and in an amount of at least 2 parts of the sodium silicate when the molar ratio of $SiO_2$ to $Na_2O$ approaches 0.5 and in an amount of at least 3 parts per 100 parts of sand, when the molar ratio of $SiO_2$ to $Na_2O$ approaches 1.5, and water in an amount sufficient to make a moldable mass but not substantially in excess of the weight of the sodium silicate employed.

2. The composition of claim 1 wherein the dry sodium silicate is composed of about 0.5 mole of $SiO_2$ per mole of $Na_2O$ and the amount of water employed is substantially equal to the weight of the sodium silicate employed.

3. The composition of claim 2 wherein the dry sodium silicate is employed in an amount of between 2 and 4 parts per 100 parts of said sand.

4. The composition of claim 2 wherein the sand employed has an A.F.S. number of between 60 and 80.

5. A composition of matter comprising foundry grade sand, powdered sodium silicate having the molar ratio and in the amount per 100 parts by weight of the sand defined by the preferred operable area shown in the annexed drawing, and water in a sufficient amount to make a free-flowing moldable mass which sets to a unitary solid suitable for molding purposes when subjected to a $CO_2$ gas atmosphere.

6. The composition of claim 5 which contains up to about 1 percent, by weight of said sand, of a carbonaceous substance selected from the class consisting of pitch, sea coal, dextrin, and mixtures thereof and water in sufficient amount to make a moldable mass.

7. The method of making sand cores and molds consisting of admixing, in the dry state, foundry grade sand, a powdered sodium silicate composed of between 0.5 and 1.5 moles of $SiO_2$ per mole of $Na_2O$ in an amount of at least 2 parts per 100 parts by weight of the sand when the molar ratio of $SiO_2$ to $Na_2O$ approaches 0.5 and in an amount of at least 3 parts per 100 parts of sand when the molar ratio of $SiO_2$ to $Na_2O$ approaches 1.5, and sufficient water to make a moldable mass but not substantially in excess of the weight of the sodium silicate used, molding the composition thus made into a desirable shape, and subjecting the molded shape to an ambient atmosphere comprising carbon dioxide gas to effect a cure thereof.

8. The method according to claim 7 wherein the sodium silicate employed consists of about 0.5 mole of $SiO_2$ per mole of $Na_2O$ and the amount of water employed is substantially the weight of the sodium silicate employed.

9. The method according to claim 8 wherein the sodium silicate is admixed with the sand and water in an amount of between 2 and 4 parts per 100 parts by weight of sand.

10. The method according to claim 8 wherein the sodium silicate admixed with the sand and water has the molar ratio of $SiO_2$ to $Na_2O$ and in the amount in parts per 100 parts by weight of the sand defined by the preferred operable area shown in the annexed drawing.

11. The method according to claim 8 wherein up to 1 percent, by weight of the sand, of a carbonaceous substance selected from the class consisting of pitch, sea coal, dextrine, and mixtures thereof is admixed with the sand, sodium silicate, and water.

12. The method according to claim 8 wherein the ambient carbon dioxide atmosphere is sufficiently concentrated to effect a cure of the molded shapes in not over about 1.5 minutes.

References Cited by the Examiner

UNITED STATES PATENTS

| 464,367 | 1/1891 | Kimble | 106—84 |
|---|---|---|---|
| 2,128,404 | 8/1938 | Dunbeck | 106—38.3 |
| 2,874,428 | 2/1959 | Bonney | 106—38.35 |
| 2,883,723 | 4/1959 | Moore et al. | 106—38.3 |
| 2,905,563 | 9/1959 | Ilenda et al. | 106—38.35 |
| 2,952,553 | 9/1960 | Ilenda et al. | 106—38.3 |

FOREIGN PATENTS 710,099    6/1954   Great Britain.

OTHER REFERENCES

Schumacher: "Carbon Dioxide Process for 'Baking' Molds and Cores," American Foundry Man, September 1954 (pages 46–49).

ALEXANDER H. BRODMERKEL, *Primary Examiner.*

JOHN R. SPECK, JOSEPH REBOLD, MORRIS LIEBMAN, *Examiners.*